Patented Apr. 1, 1930

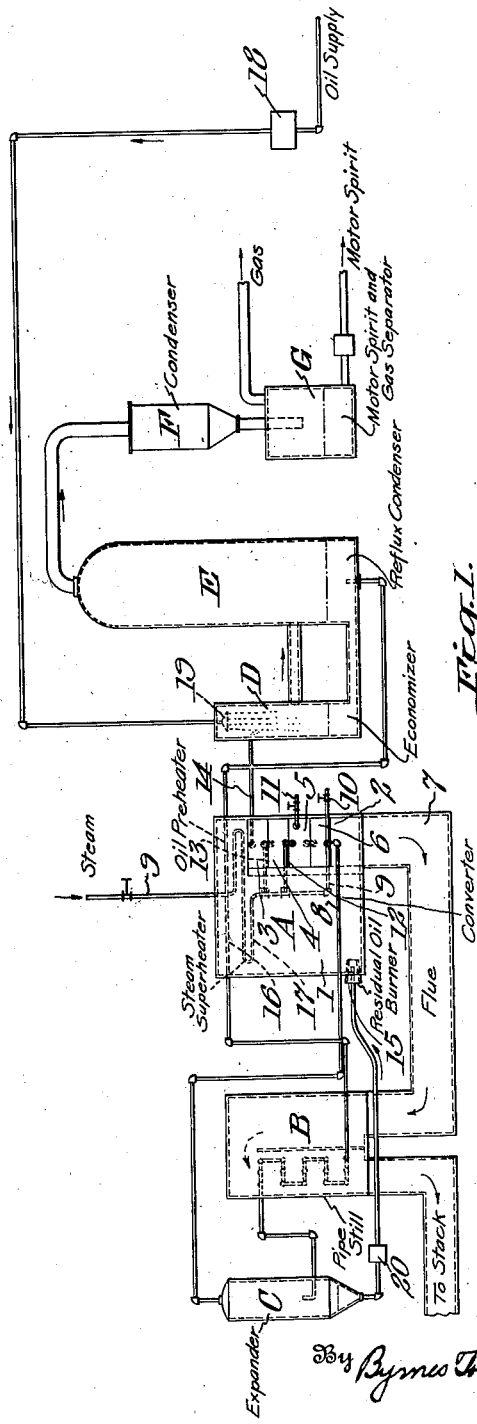

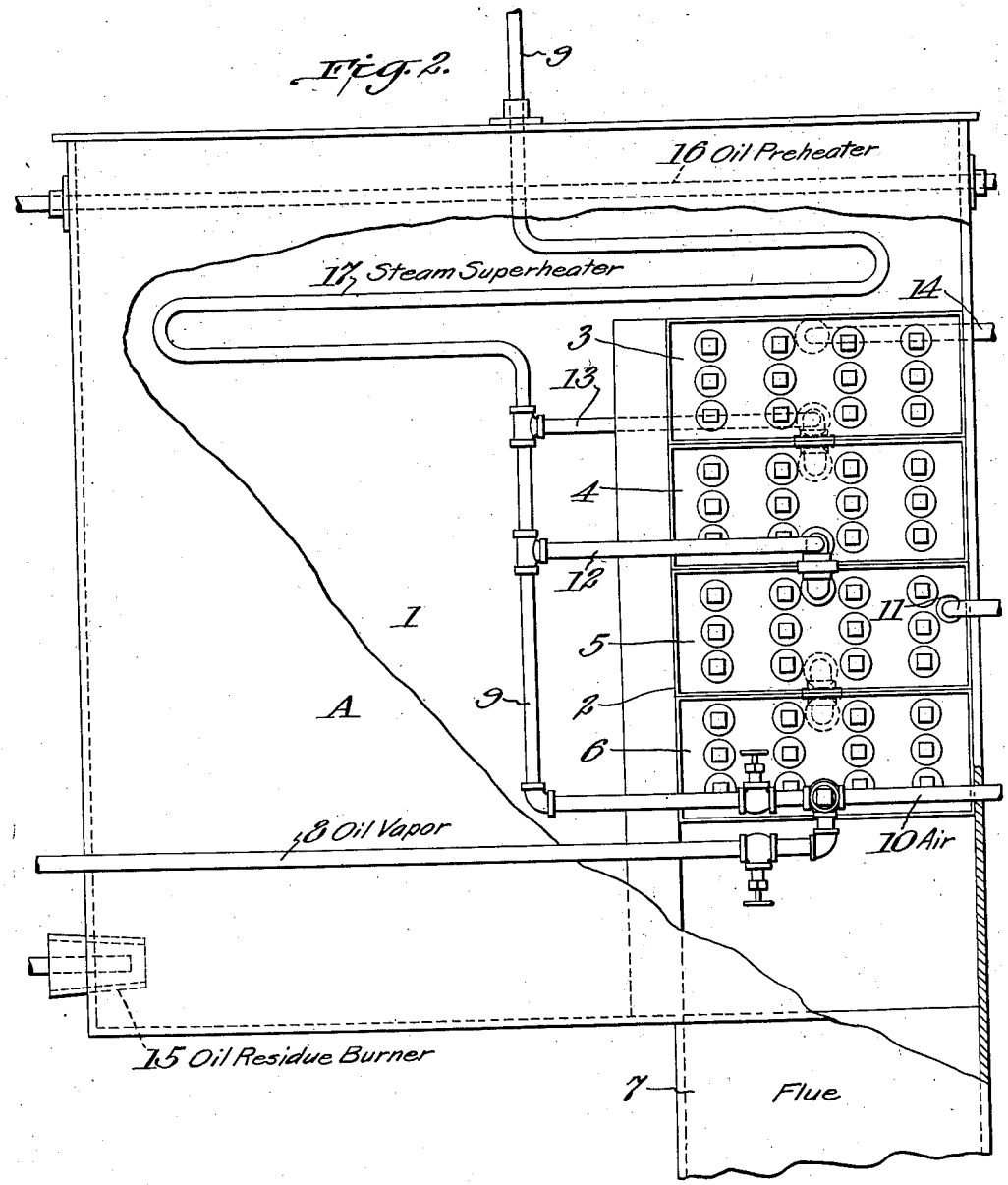

1,752,692

UNITED STATES PATENT OFFICE

ALEXANDER S. RAMAGE, OF DETROIT, MICHIGAN, ASSIGNOR TO THE OZONIDE CORPORATION, A CORPORATION OF MICHIGAN

PROCESS FOR THE PRODUCTION OF GAS AND AROMATIC HYDROCARBONS FROM HEAVY HYDROCARBON OILS

Application filed December 23, 1925. Serial No. 77,350.

In United States Patent No. 1,224,787, I have described a process of transforming mineral oils, particularly designed for the production of motor spirit, according to which, by dehydrogenation of heavy oils by means of a reducible metal oxid such as ferric oxid, a light liquid hydrocarbon mixture consisting essentially of olefins and a small amount of gas, about three cubic feet per gallon of oil treated, are produced.

In United States Patent No. 1,403,194, I have described another process according to which low-boiling-point saturated hydrocarbons are produced from heavy hydrocarbon oils by hydrogenation by the decomposition of steam in the presence of ferrous oxid. The products of this process are the light hydrocarbon mixture consisting essentially of polymethylenes and a small amount of gas, about 20 cubic feet per gallon of oil treated.

It is now my endeavor to produce a gas suitable for use for heating and illumination and a light hydrocarbon mixture suitable for use as motor fuel.

I have found that by passing hydrocarbon vapors in contact with ferric oxid and then passing the resulting gases or vapors in contact with finely divided metallic iron in the presence of varying amounts of steam and with increasing temperatures, I may obtain as the principal product a gas and a liquid hydrocarbon mixture consisting essentially of aromatic hydrocarbons suitable for use as motor spirit.

In my preferred method of working, I use four series of tubes set in manifolds and containing the ferric oxid and finely divided metallic iron, two of the series of tubes containing ferric oxid and the other two series of tubes containing the finely divided metallic iron. The tubes are heated in any suitable way, for instance in the same manner that the ordinary pipe still is heated. The vapors of the hydrocarbon to be treated, together with not more than a relatively small proportion of steam (such as one to two percent), only sufficient to prevent cracking and the formation of products other than olefins, is passed through the two series of tubes containing the ferric oxid, and the resulting gases and vapors mixed with a relatively large amount of steam, say 10 to 20 percent, are passed through the first of the series of tubes containing finely divided metallic iron, and then, with the addition of still more steam, say 20 to 30 percent or even more—according to the amount of hydrogen desired in the gas to be produced—through the last of the four series of tubes.

In the first of the four series of tubes through which the oil vapors are passed, the temperature is maintained at about 900° F. and in the second series of tubes at about 1000° F., in the third series about 1150° F., and in the fourth series at about 1300° F.

The reactions taking place are very complicated and are not fully known, but apparently are in part at least as follows:

In the lower tubes, that is, in the first series containing ferric oxid, the vapors become superheated and react with the ferric oxid forming ferrous oxid and olefins, the small amount of steam present preventing the formation of lower reduced hydrocarbons such as acetylenes and terpenes. In traversing the first and second series of tubes, the olefins formed by reaction with the ferric oxid split up principally into low-boiling and gaseous hydrocarbons such as amylene, propylene, butylene and ethylene, that is to say olefin hydrocarbons containing up to five carbon atoms per molecule. In passing through the third and fourth series of tubes containing finely divided metallic iron, the olefin hydrocarbons formed in the first two series of tubes are further reduced to hydrocarbons of the aromatic group and fixed gaseous hydrocarbons such as methane. The reactions in the last two series of tubes containing the finely divided metallic iron probably are as follows: The steam is decomposed by the metallic iron, liberating the hydrogen and forming ferric and ferrous oxid or both. The oxid of iron is immediately reduced to metallic iron by ethylene in the gases, depositing carbon in very finely divided form which at once burns to carbonmonoxid probably by combination with the oxygen content of the oxid of iron. Thus the principal constituents of the gaseous product are methane, carbon-monoxid and hydrogen with a small amount of undecomposed ethylene.

It is quite possible, by varying the temperatures of the tubes and the velocity of the vapors through the tubes, to obtain as high as 300 cubic feet of gas per gallon of oil treated, the gas having a heat value of 550 B. t. u. and consisting essentially of methane, carbon-monoxid and hydrogen. To obtain this yield of gas, it is necessary to increase the temperature in the last of the series of tubes to about 1500° F. and to introduce about 40 percent of steam into the gases entering this series of tubes.

It is easy to see that the process is very flexible and that gas of any desired heat value within a rather wide range—say from 400 B. t. u. to 1500 B. t. u.—may be obtained. The heat value of the gases apparently varies with the ethylene and higher hydrocarbons content of the gases, which in turn varies inversely with the intensity of the treatment, that is, the higher the temperature and the greater the quantity of steam used, the smaller will be the ethylene and higher hydrocarbons content and the heat value of the gases, but on the other hand, the greater will be the volume of gas produced per unit of oil treated. When using temperatures of 900° F. in the first series of tubes and 1300° F. in the last series of tubes, and the quantities of steam appropriate to these temperatures as described above, gas of about 700 B. t. u. heat value will be produced.

The hot gases leaving the last series of tubes are immediately cooled, for instance by passing them through a spray of the incoming oil, and are then delivered to a reflux tower at a temperature of about 600° F., and the resulting gases at about 450° F. are passed to condensers from which permanent or uncondensed gases and liquid hydrocarbon suitable for use as motor fuel are obtained. The liquid product from the reflux tower is mixed with the fresh supply of oil and re-treated. As an example of the process, I pass 1000 gallons of heavy fuel oil through a pipe still, thereby vaporizing 850 gallons and leaving a residue of 150 gallons which may be used as fuel. The vaporized portion is introduced into the first series of tubes maintained at a temperature of about 950° F., at the rate of about five gallons per tube per hour, with a supply of steam amounting to about one-half pound of water per tube per hour. The small amount of steam introduced into the first series of tubes with the hydrocarbon vapors prevents cracking and reduction beyond the olefin stage. If no steam were used in this step of the process, the hydrocarbons would be reduced to acetylenes and terpenes, whereas if more than about one to two percent of steam were used, the resulting hydrocarbons would be more or less saturated or hydrogenated and unsuitable for the subsequent treatment with steam in the presence of metallic iron. As the hydrocarbon vapors progress through the first two series of tubes containing ferric oxid they are reduced to aromatics and ethylene, the small amount of steam present not being decomposed at the temperature employed. The purpose of the treatment in the first two series of tubes is simply to reduce or dehydrogenate the hydrocarbons into olefins by controlled reaction with ferric oxid. The ferric oxid is, of course, reduced to ferrous oxid and must, therefore, from time to time be reoxidized by purging the tubes with steam and then blowing with air until the tubes show no further increase in temperature.

The steam, preferably superheated, introduced with the gases entering the more highly heated later series of tubes, is decomposed by the finely divided metallic iron, forming hydrogen and ferric and ferrous oxid. Presumably the ferric and ferrous oxids are immediately reduced by carbon resulting from decomposition of the hydrocarbons and also by reaction with hydrocarbons, thus forming the finely divided metallic iron and producing carbon-monoxid. There is practically no hydrogenation of the hydrocarbons present at this stage, and the hydrogen passes on with the methane and carbon-monoxid. The results obtained from the condensing system are about 300 gallons of an aromatic liquid hydrocarbon mixture composed partly of benzol, toluol, xylol, and the like, and light olefins and about 80,000 cubic feet of a gas having a heat value of about 800 B. t. u. per cubic foot.

The accompanying drawings, in which Fig. 1 is a diagrammatic vertical elevation of the essential parts of a complete gas plant and Fig. 2 is a diagrammatic vertical section of the converter, illustrates apparatus suitable for carrying out the process.

Referring to the drawings:

A is the converter, that is, the apparatus in which the oil vapors are transformed into gaseous and liquid products as described. The converter is shown in more detail in Fig. 2. The converter is similar in construction to a tubular boiler and comprises the combustion chamber 1 and the vertical shaft 2 in which the four series of tubes, 3, 4, 5 and 6 are mounted. The shaft 2 is open at its top and in communication with the combustion chamber 1 and at its bottom communicates with a flue 7. Each series of tubes, 3, 4, 5 and 6, comprises a plurality of straight tubes of any suitable size, say 3 or 4 inches in diameter, and about 10 feet long, mounted between manifolds or headers. The number of tubes in each series is, of course, immaterial. Valved conduits, 8, 9 and 10, for oil vapor, steam and air, respectively, lead to the inlet header of the series 6 of tubes. The outlet header of the series 6 of tubes is connected to the inlet header of series 5, the outlet header of the series 5 being connected to the inlet header of the series 4, and so on, the connecting conduits being provided with valves. The outlet header of series 5 has a valved vent pipe 11. The steam pipe 9 has valved branches 12 and 13 connecting with the inlet headers of series 4 and 3, and series 3 has an outlet pipe 14 leading to the economizer D. 15 is an oil burner, 16 a pipe or coil passing through the combustion chamber of the converter for preheating the oil supply, and 17 a steam superheater in the steam supply pipe 9. The tubes of series 5 and 6 contain ferric oxid in any suitable form, such as powder, or lumps such as may be formed by preparing a mortar of ferric oxid with water, drying the mass and breaking it, or cores produced by extrusion of a wet plastic mass of ferric oxid, and drying. The tubes of series 3 and 4 contain reduced metallic iron produced, for instance, by packing the tubes with ferric oxid in powdered or lump form or in the form of cores and then reducing the oxid to metal, for instance by heating the tubes to high temperature and passing oil vapors or other suitable reducing gas through them. A test piece of the filling in the tubes of series 3 and 4, placed in an acidulated solution of copper sulfate should be entirely replaced by precipitated copper.

Referring to Fig. 1: A is the converter, B a pipe still of the usual well known construction, C an expander, D an economizer, E a reflux condenser, F a condenser, and G a liquid and gas separator. The construction and operation of these parts will be understood from the following description:

Oil to be treated, such as heavy fuel oil from a suitable source of supply, not shown, is delivered by the pump 18 to the spray head 19 in the economizer D where the cold oil is contacted with the hot gases leaving the converter, thus cooling the same and being preheated. The oil collects in the base of the economizer and in the base of the reflux condenser with any liquid separated by the reflux condenser, and is delivered through the oil preheater 16 to the pipe still B. From the pipe still the oil is delivered into the expander C where a separation of oil vapors from the heavy unvaporized ends of the oil takes place. The residual heavy ends of the oil are delivered from the base of the expander C by the pump 20 to the burner 15 and the oil vapors are delivered from the top of the expander through the pipe 8 to the inlet header of the series 6 of converter tubes. At the same time, steam from any suitable source, not shown, for instance from a boiler heated by the burning of a portion of the residual heavy ends of the oil from the expander is delivered through the superheater 17 by way of pipe 9 into the inlet header of the series 6 of converter tubes. The mixture of oil vapor and steam passes up through the series 6 tubes and series 5 tubes and at the inlet to series 4 tubes is mixed with more steam, and again at the inlet to series 3 tubes with still more steam, the thus produced gas finally passing by way of the pipe 14 to the economizer D where it is partially cooled from say 1300° F., the temperature of the series 3 tubes, to about 600° F. The partially cooled gases then pass into the reflux condenser E where they are cooled to say 450° F. and any condensate so formed collects with the oil supplied to the economizer and passes on with it, as stated, for retreatment. The uncondensed gases leaving the reflux condenser E pass on to the condenser F where the liquifiable constituent suitable for use as motor fuel is condensed and collects in the separator G from which it is pumped to storage. The uncondensed portion, consisting principally of permanent gases at ordinary temperatures, passes from the condenser F to the separator G and thence to storage. The converter tubes are heated by hot gases produced by the burning of the residual oil in the combustion chamber 1 of the converter, the hot gases passing downwardly over the tubes, thence through the flue 7 to the pipe still B and from the pipe still to the stack or chimney, not shown.

In carrying out the process, when the ferric oxid in the two series 5 and 6 of tubes becomes reduced to such an extent that its dehydrogenating effect upon the oil vapors is impaired—say every three or four hours—the supply of oil vapor is shut off, the tubes are purged with steam and then the steam supply is shut off and air is admitted through the pipe 10, the resulting gases escaping through the pipe 11, the connection between series 5 and series 4 being closed, until the ferric oxid is rejuvenated or reformed. The reduced iron in the series 3 and 4 ordinarily requires no attention, but may, of course, if for any reason it becomes oxidized or contaminated with impurities, be renewed by suitable treatment with reducing gases or replaced by fresh material.

The apparatus described above forms no part of the present invention, but merely represents one form of apparatus suitable for carrying out the process. Other forms and arrangements of apparatus may readily be devised for carrying out the process. It is noted, for instance, that it is not necessary to use four distinct series of tubes, this being merely a convenient arrangement with respect to construction, heating, introduction of oil vapor and steam, etc. The object of the treatment of the oil vapors is to form light olefin gaseous products in the first two series of tubes containing ferric oxid and then to utilize these gases in the second two series of tubes containing reduced iron for reducing the oxids of iron formed by the action of the steam upon the metallic iron, thus keeping the contents of the last two series of tubes practically in the metallic state. The reduced finely divided metallic iron not only quickly decomposes steam with the liberation of hydrogen, but also readily decomposes hydrocarbons such as ethylene, butylene, propylene and amylene, with the deposition of elemental carbon in a very finely divided form which assists in reducing any oxids of iron formed by the decomposition of the steam to metallic iron, simultaneously forming carbon monoxid, a constituent of the resulting gas.

I claim:

1. Process for the production of combustible gas and aromatic hydrocarbons which comprises contacting the vapors of normally liquid paraffin hydrocarbons admixed with from one to two percent of steam with ferric oxid at a temperature at about 900 to 1000° F., whereby there is produced a mixture of gaseous olefins and contacting said mixture of gaseous olefins admixed with at least 10 percent of steam with finely divided iron at a temperature of from 1150 to 1500° F.

2. Process for the production of combustible gas and aromatic hydrocarbons which comprises contacting the vapors of normally liquid paraffin hydrocarbons admixed with a relatively small proportion of steam with ferric oxid at an elevated temperature, and thereafter contacting the resulting gases admixed with more steam with finely divided iron at a higher temperature.

3. Process for the production of combustible gas and aromatic hydrocarbons which comprises passing a stream of vapors of normally liquid paraffin hydrocarbons admixed with one to two percent of steam over and in contact with ferric oxid at a temperature ranging from 900° F. upward to 1000° F., mixing the resulting vapors and gases with from 10 to 20 percent of steam and contacting the mixture with finely divided iron at a temperature in the neighborhood of 1150° F., admixing the resulting gases and vapors with from 20 to 40 percent of steam and contacting the mixture with finely divided iron at a temperature of at least 1300° F.

4. Process for the production of a combustible gas and aromatic hydrocarbons from heavy mineral oil which comprises contacting vapors of said mineral oil first with ferric oxid and then with finely divided iron at progressively increasing temperatures and in the presence of progressively increasing quantities of admixed steam.

5. Process for the production of combustible gas and aromatic hydrocarbons which comprises contacting the vapors of normally liquid paraffin hydrocarbons admixed with a relatively small proportion of steam with ferric oxid at a temperature of about 900 to 1000° F., and thereafter contacting the resulting gases and vapors admixed with more steam with finely divided iron at a temperature of from 1150 to 1500° F.

6. Process for the production of combustible gas and aromatic hydrocarbons which comprises contacting the vapors of normally liquid paraffin hydrocarbons admixed with a quantity of steam sufficient to prevent the reduction thereof beyond the olefin stage but insufficient to produce extensive hydrogenation, with ferric oxid at a temperature of about 900 to 1000° F., and contacting the resulting gases and vapors admixed with a relatively greater quantity of steam with finely divided iron at a temperature of from 1150 to 1500° F.

7. Process for the production of combustible gas and aromatic hydrocarbons which comprises contacting with ferric oxid the vapors of a normally liquid paraffin hydrocarbon mixture admixed with steam in quantity only sufficient to prevent substantial reduction beyond the olefin stage at a temperature and for a period sufficient to convert the hydrocarbons of said mixture principally into olefins having not more than five carbon atoms per molecule and contacting the resulting gases with metallic iron in the presence of such a quantity of steam and at such a temperature that the iron is maintained substantially in the metallic state.

In testimony whereof, I affix my signature.

ALEXANDER S. RAMAGE.